UNITED STATES PATENT OFFICE.

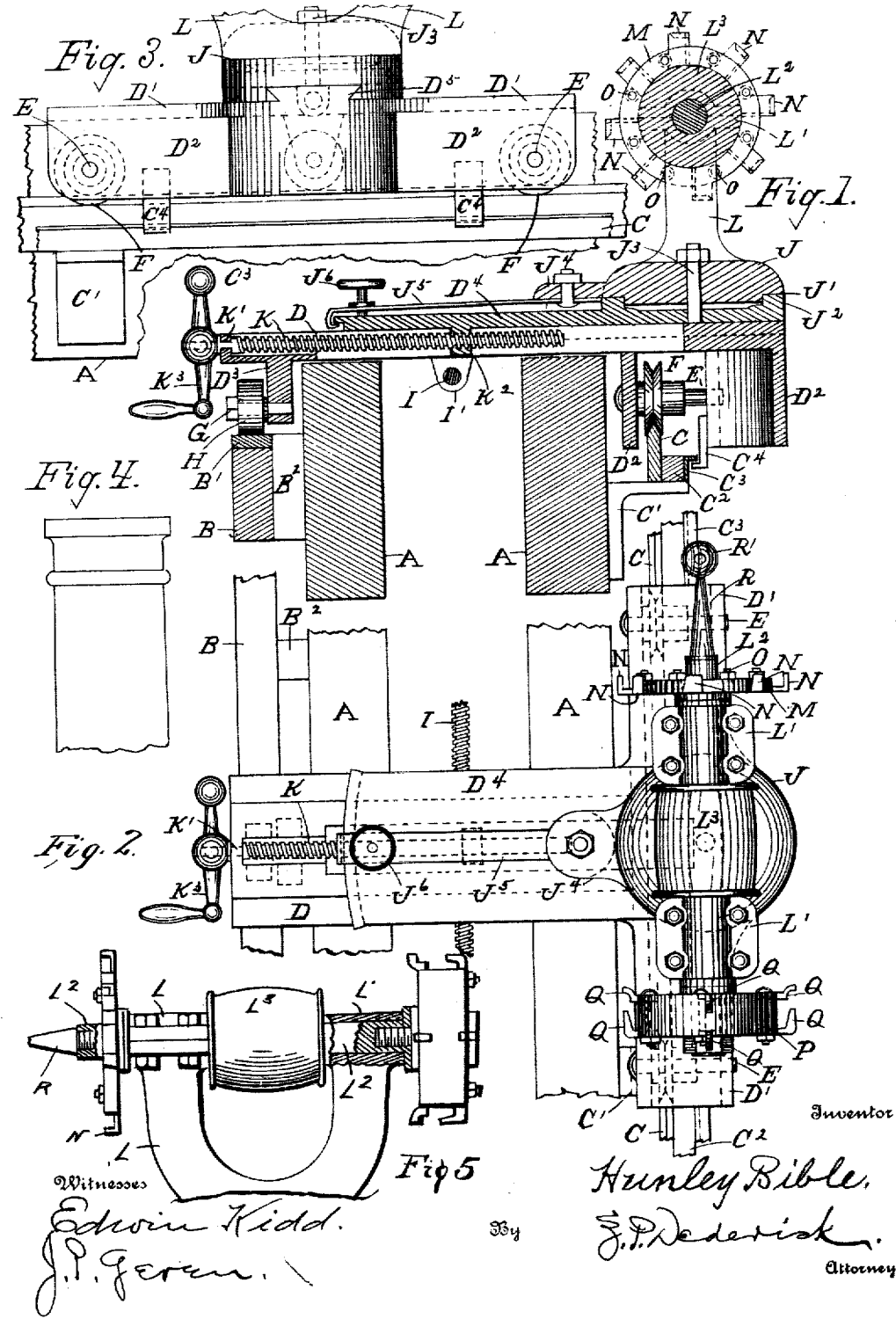

HUNLEY BIBLE, OF SHERMAN, TEXAS.

WOOD-COLUMN-TURNING LATHE.

No. 865,673.        Specification of Letters Patent.        Patented Sept. 10, 1907.

Application filed October 23, 1906. Serial No. 340,215.

*To all whom it may concern:*

Be it known that I, HUNLEY BIBLE, a citizen of the United States, residing at Sherman, in the county of Grayson and State of Texas, have invented certain new and useful Improvements in Wood-Column-Turning Lathes, of which the following is a specification.

This invention relates to improvements in means for turning and fluting colonial wood columns, and has for its object, among others, the production of a simple and effective device which may be used for moving the carriage lengthwise of the lathe bed, and for operating the cross-feed of same.

It has for a further object to provide the cross-slide of carriage with a cutter head that may be swiveled and locked in any desired position, thus bringing the cutters for the different service required in operative position to perform same.

It has for an object, further, to so dispose the rollers upon which the carriage runs and the operating mechanism where they will be out of the way of the dust and chips.

Still a further object is to decrease the frictional contact, whereby the carriage can be made to run easier.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a side view in section, taken longitudinally through the carriage base, showing the lathe carriage mounted in operative position upon a cross-section of the lathe-bed, and illustrating the relative construction and arrangement thereof. Fig. 2 is a plan view of the same; Fig. 3 is a rear end view of the carriage, and fragmentary side view of the lathe bed;
and Fig. 4 is a view showing the finished end of a column. Fig. 5 is a front elevation of the swinging head with the ends of the spindle shown in section.

Referring now to the details of the drawings by letter, A designates the wooden bed or shears of a lathe, to one end of which is secured in the usual manner an ordinary lathe-head, and at the opposite end an ordinary tail-stock, as commonly used on wood turning lathes; neither of which is shown in the drawing.

Secured to outside of lathe shear, and extending along front side of lathe, is provided a wooden track B, capped with a thin plate of iron B' and spaced a slight distance from the shear A by blocks B². To the outside of back lathe-shear, and extending the length of same is provided a V shaped metal track C carried by metal brackets C' and additionally supported by metal bar C²; on these tracks, B, and C, run rollers which carry the lathe-carriage.

D is the base of the carriage made practically T shaped by providing the rear end with lateral extensions D', beneath which are overhanging aprons D², in which are mounted horizontal shafts E, carrying guide roller F, having V shaped peripheries adapted to run on the V track C, and thus carry the rear portion of carriage. Extending the length of metal bar C² and secured thereto is an L or angle iron C³. The downwardly projecting hooks C⁴ secured to outer apron D² pass along under projecting flange of the angle bar thus holding the back portion of carriage to track C. Secured near front end of carriage-base D, on the under side thereof, and preferably made integral therewith, is a downwardly projecting lug D³, provided with an outwardly projecting pin G on which is loosely journaled a roller H adapted to run on the track B and by which the front end of carriage D is carried.

Motion is transmitted to the carriage from a suitable lead-screw, sprocket chain, or other equivalent device, which may be driven in the usual manner by a driving-shaft or other prime motor, and when the feeding device consists of a lead-screw I, as illustrated, it passes through a downwardly projecting lug I' attached to carriage-base D; the lug being bored and threaded longitudinally to receive the screw. In place of the solid nut as shown, one provided with means for opening and closing it can be employed, which would enable the carriage to be quickly drawn back by hand.

The cross-slide D⁴ is fitted in suitable guiding ways D⁵ upon the top of the carriage base D, and carries a swinging or oscillating head J, around the base of which is provided a circular recess J' that fits a circular raised portion J² formed on the top side of cross-slide D⁴, being movably held in this position by stud bolt J³. At the side of swinging head J is a projecting lug J⁴ to which is bolted a lever J⁵ by which the head may be turned to any desired angle and then securely locked by the stop screw J⁶. As shown, the cross-slide D⁴ is operated by means of a screw K running transversely of the carriage; said screw being journaled at K' appurtenant to or integral with carriage base D, moving the cross-slide D⁴ through the medium of nut K² integral with said cross-slide. The cross-feed screw K is provided at its forward extremity with the crank K³ secured thereto, which may be operated, whenever desirable to move the cross-feed.

The swinging head J carries two vertical standards L, that terminate in journal boxes L', carrying the cutter head spindle L² that is provided with a pulley L³ and preferably driven by an over head drum, not shown. Secured to one end of the spindle L² is a cutter head M, designed for turning the body portion of wood columns; it is provided preferably with eight L shaped cutters N secured thereto by bolts O. At the opposite end of spindle $L^2$ is a cutter-head P, carrying cutting bits Q designed for finishing the molded top end of a column. The bits as shown are designed for a finish as exhibited in Fig. 4, but other designs may be formed by providing and adjusting bits suitable for the same. Both ends of spindle $L^2$ are bored and internally threaded for the purpose of securing tools for special purposes; at one end is shown a cutter for fluting round columns. It consists of a shank R, screwed into the end of lathe spindle $L^2$ and extending outward, terminating in a rose bit R′, that may be of any diameter to suit the size of flute to be cut.

To turn, mold, flute and finish the outside of a wood column or the like, an operation of the apparatus would occur substantially as follows; a column to be finished is supported between the centers of lathe head and tail stock of the lathe, the head J is swiveled around and moved laterally bringing the cutter head M nearly in contact with column. Power is then applied so as to rapidly rotate the cutter head M, and to slowly rotate the column, which simultaneously turns the screw I that advances the carriage. By means of the crank $K^3$ the cutter head may now be adjusted to take a light or heavy cut as desired, as the cutter head travels the length of the column. The progress of this cutter is stopped at the proper distance before reaching the extreme end of column, to admit of the cutter head P being swiveled around into cutting position for finishing the molded end; which is accomplished by loosening the stop-screw $J^6$ and turning the lever $J^5$, thus moving the cutter head M away from the column, and the head P towards it; when the proper depth of cut necessary can be adjusted by the screw K. When in this position the carriage does not travel along the ways but remains stationary. With this molding completed, a column not required to be fluted is finished; but should it be desired to flute same it is accomplished without removing column from the lathe, in the following manner. Release the stop-screw $J^6$ and swing the head J until the rose-bit R′ is in close proximity to the column, adjust it to depth of flute desired by screw K. The feed-screw I now being started, the length of flute will be determined by the distance carriage D is allowed to travel. Any suitable device for spacing the flutes at equal distances around the circumference of column, and also for firmly holding it while being fluted can be employed.

The operation of my invention will be readily perceived from the foregoing, and it will be understood that with a very simple construction and novel arrangement of parts I have obtained a device which will obviate the necessity for any hand work being performed on the turning or other outside finish of colonial columns; besides, the turning, molding and fluting will be accomplished in a much more uniform and expeditious manner than would otherwise be possible.

Having thus fully described my invention, what I claim, and desire to secure by Letters Patent, is—

1. The combination with a lathe and a carriage provided with a cross-feed, of an auxiliary swinging head pivotally mounted upon the carriage, a lever secured to said head, and a clamping screw carried by the lever for securing the auxiliary head in the adjusted position.

2. The combination with a lathe having a carriage, of an auxiliary swinging head pivotally mounted upon the carriage, a spindle journaled in said head, cutters mounted upon the ends of said spindle, a lever secured to the base of the head, and a clamping screw carried by the lever for securing the auxiliary head in adjusted position.

3. The combination in a lathe having a carriage, a stud bolt secured near the end of the carriage, of an auxiliary swinging head pivotally secured upon said bolt carrying journal standards, a spindle journaled in said standards, cutter heads secured upon the ends of the spindle, a lever arm secured to the auxiliary head, and a clamping screw carried in said lever to engage the carriage and secure the auxiliary head in adjusted position.

In testimony whereof I affix my signature in presence of two witnesses.

HUNLEY BIBLE.

Witnesses:
EDWIN KIDD,
J. P. GERIN.